US010849087B2

(12) United States Patent
Jiang et al.

(10) Patent No.: US 10,849,087 B2
(45) Date of Patent: Nov. 24, 2020

(54) COEXISTENCE OF WIFI AND TDMA COMMUNICATIONS WITHIN AN ACCESS POINT IN AN IOT NETWORK

(71) Applicant: Hewlett Packard Enterprise Development LP, Houston, TX (US)

(72) Inventors: Yafeng Jiang, Beijing (CN); Qiang Zhou, Beijing (CN); Chunfeng Wang, Beijing (CN); Zhiyuan Yao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 45 days.

(21) Appl. No.: 16/250,790

(22) Filed: Jan. 17, 2019

(65) Prior Publication Data
US 2020/0236640 A1 Jul. 23, 2020

(51) Int. Cl.
*H04W 4/00* (2018.01)
*H04W 56/00* (2009.01)
*H04W 4/80* (2018.01)
*H04W 84/18* (2009.01)

(52) U.S. Cl.
CPC .......... *H04W 56/003* (2013.01); *H04W 4/80* (2018.02); *H04W 56/0045* (2013.01); *H04W 84/18* (2013.01)

(58) Field of Classification Search
USPC .... 370/229, 230, 230.1, 236, 252, 311, 328, 370/329, 330, 336, 337, 347, 350, 468
See application file for complete search history.

(56) References Cited

U.S. PATENT DOCUMENTS

| | | | |
|---|---|---|---|
| 8,335,206 B1 * | 12/2012 | Hirsch | H04W 72/1215 370/350 |
| 9,319,165 B2 | 4/2016 | Chen et al. | |
| 9,433,003 B2 | 8/2016 | Wietfeldt et al. | |
| 2003/0083095 A1 * | 5/2003 | Liang | H04W 72/1215 455/552.1 |
| 2006/0030265 A1 * | 2/2006 | Desai | H04W 72/1215 455/41.2 |
| 2006/0292986 A1 * | 12/2006 | Bitran | H04W 16/14 455/41.2 |

(Continued)

OTHER PUBLICATIONS

Bluetooth and WiFi Coexistence Bluetooth and WiFi Coexistence, (Web Page), 2016.

(Continued)

*Primary Examiner* — Nguyen H Ngo
(74) *Attorney, Agent, or Firm* — Sheppard Mullin Richter & Hampton LLP

(57) ABSTRACT

Systems and methods are provided for implementing a coexistence coordinator in an access point (AP) operating in a Internet of Things (IoT) network. The coexistence coordinator coordinates transmission of both IoT-related data from an IoT radio and WiFi data from a WiFi radio, the IoT radio and the WiFi radio coexisting in the AP. The coexistence coordinator synchronizes time between the WiFi radio and the IoT radio so that times during which IoT-related data is to be sent from the IoT radio (in accordance with Time-Division Multiple Access (TDMA) channel access method) can be determined. Operation of the WiFi radio is suspended during those times when the IoT-related data is transmitted from the IoT radio.

17 Claims, 7 Drawing Sheets

(56) References Cited

U.S. PATENT DOCUMENTS

| | | | | |
|---|---|---|---|---|
| 2006/0292987 A1* | 12/2006 | Ophir | ............... | H04W 72/1215 |
| | | | | 455/41.2 |
| 2008/0247445 A1* | 10/2008 | Guo | ...................... | H04B 1/406 |
| | | | | 375/220 |
| 2008/0279130 A1* | 11/2008 | Lewis | .............. | H04W 52/0225 |
| | | | | 370/311 |
| 2009/0063740 A1* | 3/2009 | Yeh | .................. | H04W 72/1215 |
| | | | | 710/113 |
| 2014/0269309 A1* | 9/2014 | Lee | .................. | H04W 52/0235 |
| | | | | 370/235 |
| 2017/0094677 A1 | 3/2017 | Liu et al. | | |
| 2017/0347373 A1* | 11/2017 | Vig | .................. | H04W 74/0816 |
| 2018/0091929 A1* | 3/2018 | Bi | ......................... | H04W 16/14 |

OTHER PUBLICATIONS

Croce, D. et al., An Inter-Technology Communication Scheme for WiFi/ZigBee Coexisting Networks, (Research Paper), Feb. 20-22, 2017, 6 Pgs.

Driving Wi-Fi, zigbee, and Thread coexistence in the 2.4 GHz band, part 1: Unmanaged coexistence, (Research Paper), Apr. 28, 2017, 17 Pgs.

How does BLE/WiFi-Coexistence in the ESP32 work?, (Research Paper), Mar. 16, 2017, 3 Pgs.

Valck, P.D. et al, Exploiting Programmable Architectures for WiFi/ZigBee Inter-Technology Cooperation, (Research Paper), Dec. 2014, 49 Pgs.

Zhang, X. et al., Enabling Coexistence of Heterogeneous Wireless Systems: Case for Zigbee and Wifi, (Research Paper), May 17-19, 2011, 11 Pgs.

* cited by examiner

COEXISTENCE OF WIFI AND TDMA COMMUNICATIONS WITHIN AN ACCESS POINT IN AN IOT NETWORK

DESCRIPTION OF RELATED ART

The Internet of Things (IoT) can refer to a system or network of devices or items that are provided with unique identifiers that allow them to transfer data over a network. These objects may be embedded with sensors that enable these objects to collect and exchange data. For example, one IoT model connects headless sensors over wireless connections to a cloud service that manages the headless sensors and collects traffic. The wireless connections may be established, for example, over a wireless local area network (WLAN) such as a WiFi network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
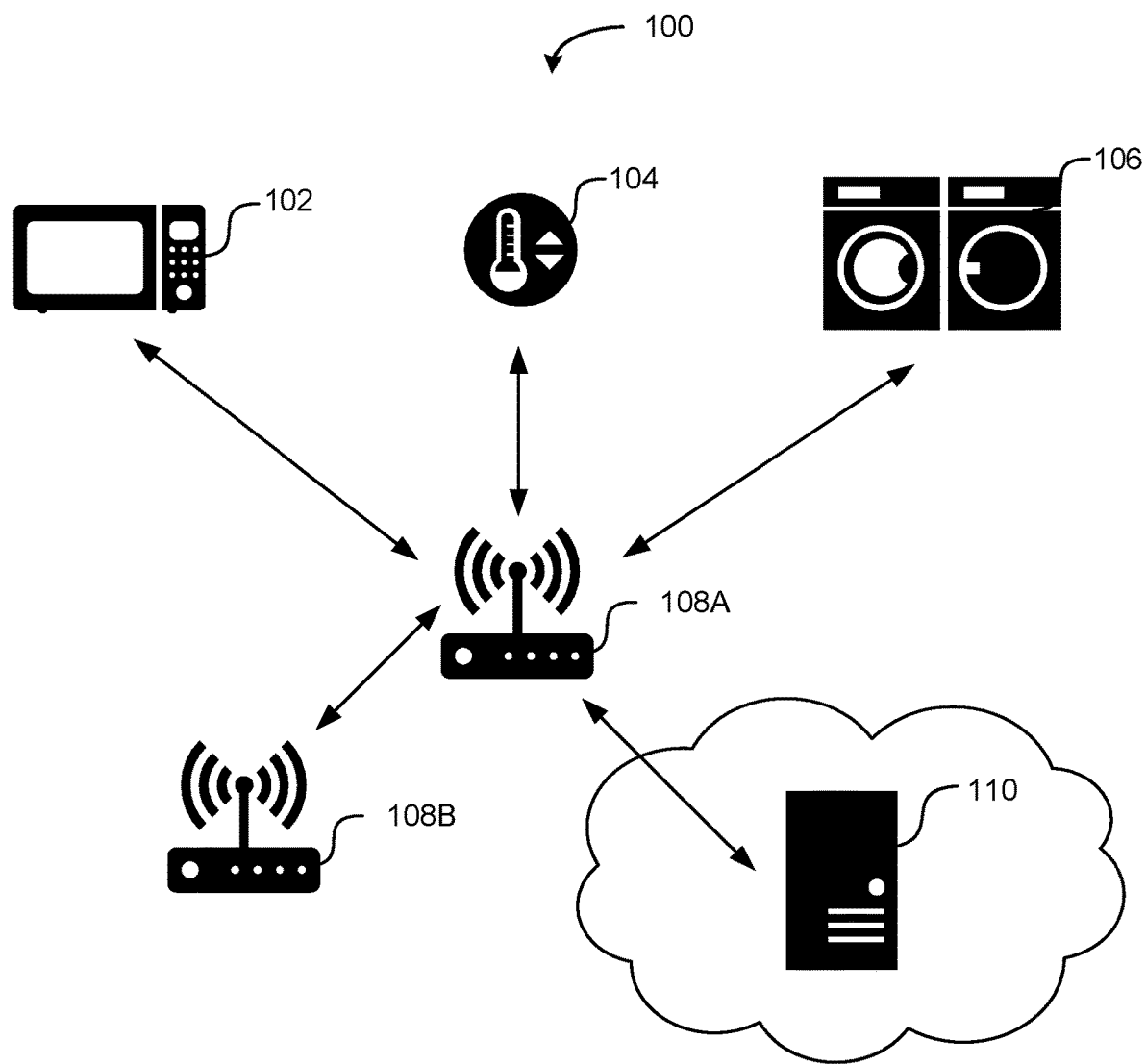
FIG. 1 illustrates an example IoT network.

The figures are not exhaustive and do not limit the present disclosure to the precise form disclosed.

DETAILED DESCRIPTION

As alluded to above, "things" in the Internet of Things may refer to a wide variety of devices such as heart monitoring implants, biochip transponders on farm animals, automobiles with built-in sensors, smart lights, and smart thermostat systems that may allow remote monitoring. It is expected that the Internet of Things may grow to include billions of devices in the near future.

There are many technologies that enable communication between devices in a IoT network, such as Bluetooth Low Energy (BLE), Near Field Communications (NFC), Radio Frequency Identification (RFID), ZigBee, Narrowband IOT (NB-IOT), WiFi (e.g., the various 802.11xx standards), etc. As noted above, devices such as sensors or devices having sensors embedded therein may connect to an IoT network via a WLAN, such as a WiFi network. In order for a sensor to connect to its service in the cloud, the sensor may communicate over, e.g., a WiFi network, and thus is configured to connect to the WiFi network through network discovery procedures.

In a WiFi-compliant WLAN, access points (APs) receive data by wired Ethernet, perform a conversion to 2.4 GHz or 5 GHz wireless signals, and send/receive wireless traffic to and from nearby wireless clients or devices, e.g., IoT devices and WiFi clients. However, an AP is not only a WiFi provider, but also an IoT service provider. Nowadays, many APs integrate two or more of the aforementioned communications technologies such that multiple types of communications technologies function together, e.g., WiFi and BLE, RFID and ZigBee.

Because communications technologies, such as WiFi, BLE, RFID, and ZigBee all use the 2.4 GHz band or range (each band/range being divided in multiple frequency channels within that band/range), various embodiments of the present disclosure provide a solution that allows WiFi and other IoT protocols to coexist. In particular, various embodiments are directed to the coexistence of WiFi-compliant devices, such as APs and IoT devices that transfer data in accordance with a Time-division multiple access (TDMA) communications scheme. TDMA can refer to a type of time-division multiplexing channel access method, where multiple users/devices share the same frequency channel by dividing a signal into different time slots. The users/devices may transmit one after another, each transmitting over its dedicated time slot. In this way, multiple users/devices may share the same transmission medium, e.g., RF channel, while using only a part of the RF channel's capacity.

One advantage of TDMA is that an AP or other WiFi radio can be made aware of the time at which an IoT radio's transmissions start and when they end. Accordingly, various embodiments effectuate a coexistent method of communications, whereby WiFi transmissions can be suspended while TDMA (IoT) transmissions occur within the same device, such as in an AP. In this way, no data from an IoT radio is lost. Moreover, during the period when the WiFi radio is suspended, 802.11 beacons, as well as management and/or data frames regarding authentication, association, Extensible Authentication Protocol (EAP), etc., are not negatively impacted, and there is minimal impact to WiFi throughput and connectivity. Once the time period for IoT transmissions from the IoT radio end, WiFi transmissions can resume.

Further still, various embodiments of the present disclosure are directed to a channel-division communications method, wherein the WiFi radio of an AP may use one or more channels in the lower range of the 2.4 GHz band, and the IoT radio of the AP may use one or more channels in the upper range of the 2.4 GHz band, or vice-versa. In this way, interference between the WiFi radio and the IoT radio of an AP or other WiFi client can be reduced or avoided.

FIG. 1 illustrates an example IoT network 100. As shown in FIG. 1, IoT network 100 may comprise a plurality of IoT devices, including but not limited to a microwave oven 102, a home heating ventilation and air conditioning (HVAC) system 104, and a washer/dryer 106. Each of these IoT devices may wirelessly exchange data (e.g., sensor data) with one or more APs, e.g., APs 108A and 108B. APs 108A and 108B create a WLAN in an office, home, building, etc. by connecting to a wired router, switch or hub via Ethernet, and projecting a WiFi signal to a designated region or area. Ultimately, data from IoT devices 102, 104, and/or 106 may be communicated to a, e.g., a server 110 (or service) that collects this data, and manages IoT devices 102, 104, and/or 106 (or the respective sensors embedded therein). Server 110 may reside in the cloud, e.g., a network of servers (server 110 being one of those servers) that operate and/or communicate with each other to effectuate a single ecosystem. A public cloud may share publicly available resources/services over, e.g., the Internet, while a private cloud is not shared and may only offer resources/services over a private data network. A hybrid cloud may share services between public and private clouds depending on the purpose of the services.

Figure 2:
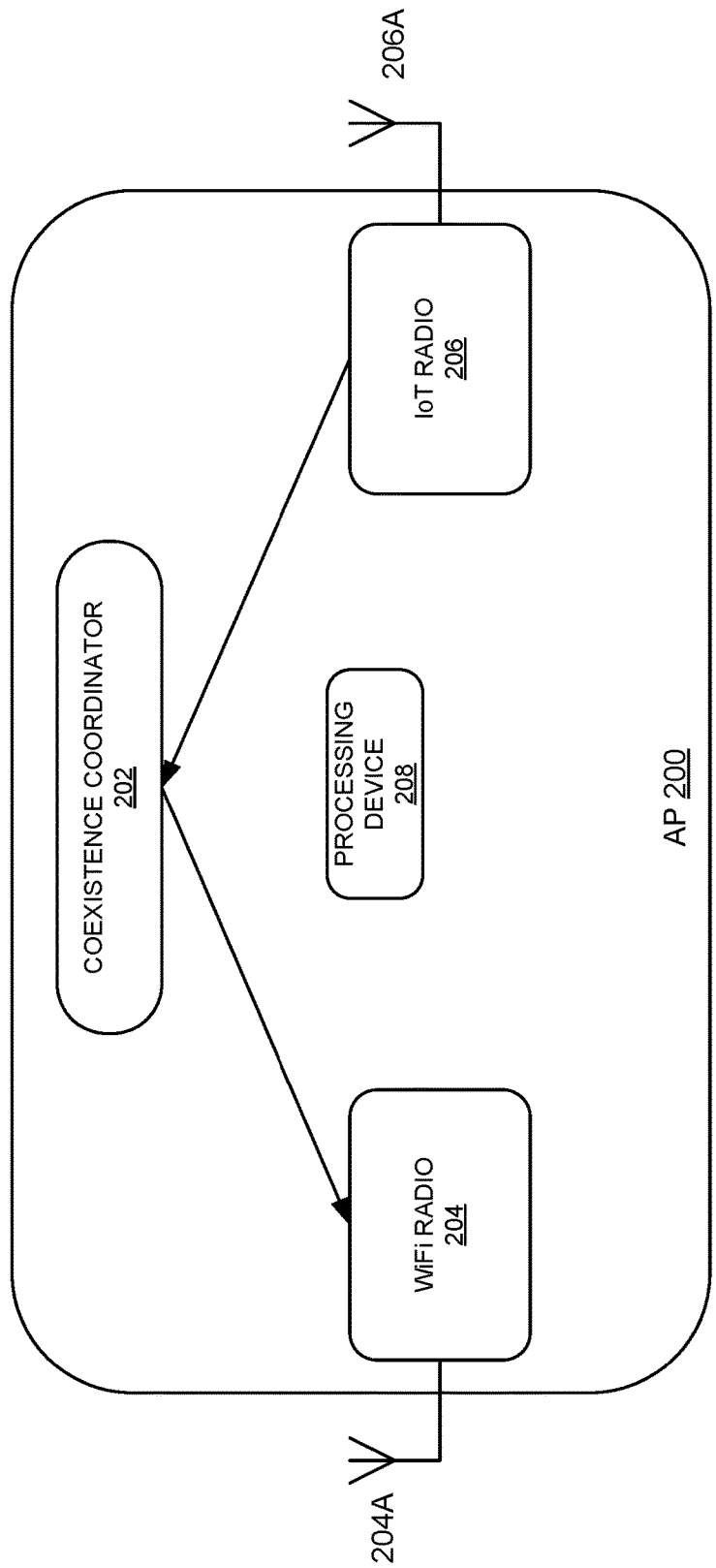
FIG. 2 illustrates and example representation of an access point configured in accordance with various embodiments of the present disclosure.

FIG. 2 illustrates an example AP 200 configured in accordance with various embodiments of the present disclosure. As illustrated in FIG. 2, AP 200 may include a coexistence coordinator 202, a WiFi radio 204, an IoT radio 206, and a processing device 208, where processing device 208 may be a central processing unit (CPU), a semiconductor-based microprocessor, or other appropriate processor. AP 200 may comprise additional components or elements that have not been illustrated or described in detail herein. However, a personal of ordinary skill in the art would understand what these additional components or elements may be, e.g., ports. Although not illustrated, one or both of WiFi radio 204 and IoT radio 206 may have their own processing device for controlling its operation. With the exception of coexistence coordinator 202, AP 200 may be an embodiment of AP 108A and/or AP 108B. Antennas may be operatively connected to WiFi radio 204 and IoT radio 206, i.e., antenna 204A and antenna 206A, respectively. WiFi radio 204, through antenna 204A, transmits and receives WiFi signals within a network, such as IoT network 100 of FIG. 1. For example, AP 200 may communicate with other APs in IoT network 100, transmit beaconing signals, exchange authentication messages/information, exchange association messages/information, etc. IoT radio 206, through antenna 206A, may wirelessly exchange data (e.g., sensor data) with IoT devices, such as IoT devices 102-106 illustrated in FIG. 1. It should be noted that WiFi radio 204 and/or IoT radio 206 may be an on-board radio, or in other embodiments, a plug-in radio that operatively connects to AP 200 by way of a communications port or interface, e.g., a Universal Serial Bus (USB) port.

It should further be noted that in accordance with some embodiments, a coexistence coordinator may be used to support WiFi radios and IoT radios that may be implemented on different devices. For example, a WiFi AP and an IoT AP may be located close to each other, such that the WiFi and IoT communications may interfere with each other. Accordingly, a coexistence coordinator implemented in either the WiFI AP or the IoT AP (or another network device) may effectuate a coexistent communications scheme between the WiFi AP and the IoT AP.

Coexistence coordinator 202 may be an implementation of software, hardware, or a combination of both software and hardware. For example, coexistence coordinator may be software component operating vis-à-vis processing device 208 in AP 200 configured to cause AP 200 to implement a coexistent communications scheme within AP 200, as will be described in greater detail below. Alternatively, coexistence coordinator may comprise physical and/or logical circuitry or other processing hardware that either alone, or in combination with software instructions is configured to cause AP 200 to implement the aforementioned coexistence scheme within AP 200.

As noted above, an IoT radio of an AP may use TDMA to transfer data associated with IoT tags, IoT sensors, etc. Because an IoT radio transfers data using TDMA, i.e., during one or more particular time slots of an RF channel, knowing when an IoT transmission time slot starts (from the point of the IoT radio) and then suspending WiFi transmissions accordingly can improve performance of the IoT radio, especially when the AP is sustaining a high level of CPU utilization. That is, with a high level of CPU utilization, e.g., greater than 90%, communications between the WiFi radio 204, the IoT radio 206, and coexistence coordinator 202 may involve certain latencies. Without a mechanism, such as an algorithm or other mechanism in coexistence coordinator 202, determining when an IoT radio is going to transmit data, the time when operation of WiFi radio 204 should be suspended may not be accurate. This can result in interference, thus hampering operation of IoT radio 206. However, as described herein, use of coexistence coordinator 202 avoids such issues.

Figure 3A:
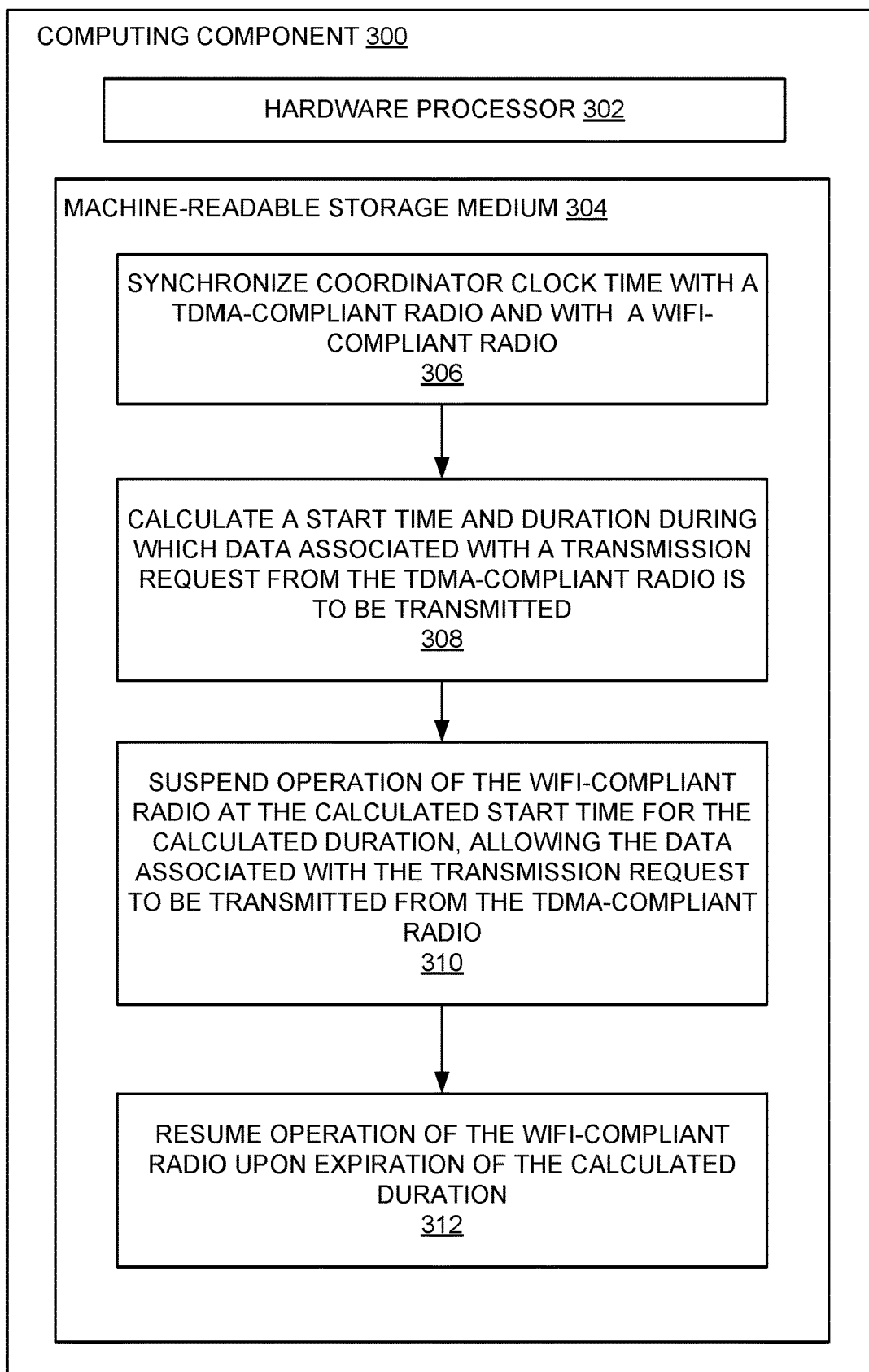
FIG. 3A is a block diagram of an example computing component for allowing the coexistence of multiple transmission schemes or methods in accordance with various embodiments of the present disclosure.

FIG. 3A illustrates an example computing component 300 for coordinating the coexistence of WiFi communications vis-à-vis WiFi radio 204 with TDMA communications vis-à-vis IoT radio 206. FIG. 3A will be described in conjunction with FIG. 3B, which illustrates an example message flow between coexistence coordinator 202, WiFi radio 204, and IoT radio 206 in accordance with one embodiment of the present disclosure.

Referring to FIG. 3A, a computing component 300 may include a hardware processor 302 and a machine-readable storage medium 304. Computing component 300 may be, for example, a server computer, a controller, or any other similar computing component capable of processing data. Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312 for controlling WiFi radio 204 and IoT radio 206 (FIG. 2) such that WiFi communications and TDMA communications may coexist within the same device, e.g., AP 200 of FIG. 2.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312, for controlling WiFi radio 204 and IoT radio 206 (FIG. 2) such that WiFi communications and TDMA communications may coexist within the same device, e.g., AP 200 of FIG. 2.

Computing component 300 may embody/may be embodied in AP 200 (FIG. 2) in order to effectuate the functionality of coexistence coordinator 200. To determine when a TDMA time slot associated with data transmissions from IoT radio 206 starts, hardware processor 302 may execute instruction 306 in order to synchronize a coordinator clock time with a TDMA-compliant radio and with a WiFi-compliance radio. That is, and referring to FIG. 3B, coexistence coordinator 202 may set its monotonic clock time to comport with both WiFi radio 204 and IoT radio 206. In some embodiments, AP 200 may be running specific firmware, in which case, the monotonic clock time may be set to that of the firmware. Synchronization of the monotonic clock time of AP 200 may occur when AP 200 boots up, and can ensure that coexistence coordinator 202, WiFi radio 204, and IoT radio 206 all use the same time benchmark.

Figure 3B:
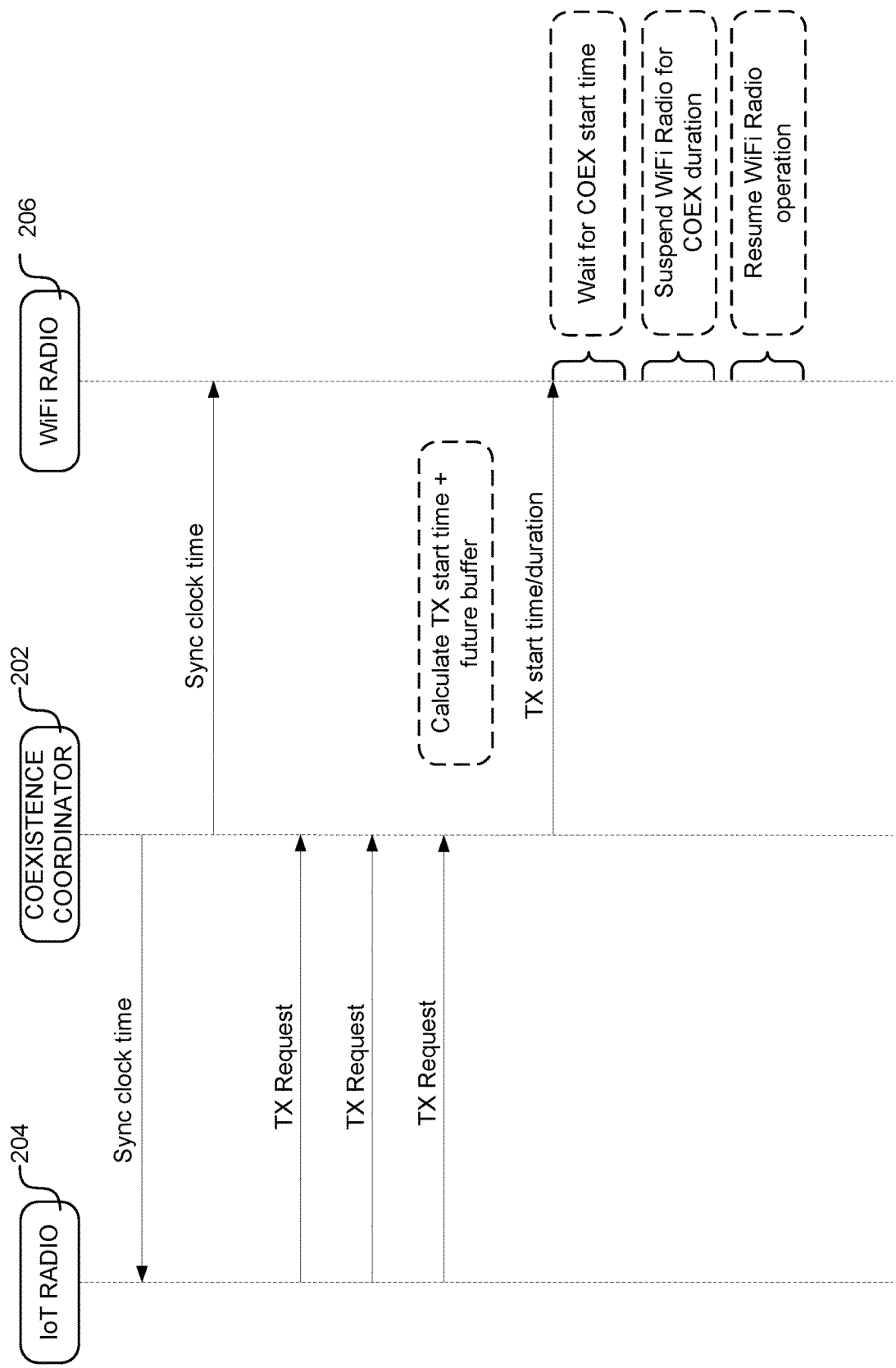
FIG. 3B is a message flow diagram illustrating various processes performed that allow for the coexistence of multiple transmission schemes or methods in accordance with various embodiments of the present disclosure.

Still referring to FIG. 3B, IoT radio 206 may periodically send a request to transmit data to coexistence coordinator 202. Such transmission requests may include a timestamp of when the transmission of data by IoT radio 204 is to occur. Because the monotonic clock time of coexistence coordinator 202 is set to that of IoT radio 206 (and WiFi radio 204), coexistence coordinator 202 is aware of when IoT radio 206 wants to transmit data. If commensurate with receipt of a transmission request, data frames are, e.g., queued, and ready to be sent, coexistence coordinator 202 may begin calculating a start time and duration of the transmission that is to occur, and this is signaled to WiFi radio 204 (described below). If there are no data frames that are ready for transmission, coexistence coordinator 202 need not begin calculating a start time and duration for that transmission request.

Additionally, hardware processor 302 may execute instruction 308 in order to calculate a start time and duration during which data associated with a transmission request from the TDMA-compliant radio is to be transmitted. That is, and referring to FIG. 3B, after receipt of a transmission request or some plurality of transmission requests from IoT radio 204, coexistence coordinator 202 calculates a start time and duration associated with the transmission request. The calculation(s) performed by coexistence coordinator 202 may encompass each transmission request that will fall within some "near future" time period. For example, coexistence coordinator 202 may calculate start times and durations for some number of transmissions that are to occur within, e.g., the next 20 milliseconds. The start time and duration associated with each transmission request may be sent to WiFi radio 204.

Coexistence coordinator 202 may calculate transmission start times based on the timestamp included with each transmission request. It should be noted that the transmission start times may be calculated such that WiFi radio 204 will be suspended (discussed in greater detail below) some amount of time prior to the time when WiFi radio 204 would actually need to be suspended. In some embodiments, this amount of time may be approximately 100 ms earlier than when WiFi radio 204 would need to be suspended (if considering the start time based on the timestamp alone). That is, when calculating transmission start times, coexistence coordinator 202 accounts for and provides some time as a buffer to allow the procedures for coexisting WiFi and TDMA communications to be performed or processed, e.g., the calculation of transmission start times, suspension of WiFi radio 204, etc.

Upon receipt of a signal(s) or message(s) indicative of a transmission start time and duration at WiFi radio 204, WiFi radio 204 may wait for the transmission start time to come, recalling that the transmission start time includes a time buffer to account for coexistence procedures to be performed. Hardware processor 302 may execute instruction 310 to suspend operation of the WiFi-compliance radio at the calculated start time and for the calculated duration, allowing the data associated with the transmission request to be transmitted from the TDMA-compliant radio. Again referring to FIG. 3B, at the time transmission is to start (based on the start time calculated by coexistence coordinator 202, WiFi radio 204 suspends operation for the calculated duration.

It should be understood that when the time (commensurate with the timestamp included with a transmission request) to transmit TDMA communications (IoT data) comes, WiFi radio 204 stops transmitting data frames. However, 802.11xx beacon frames and certain management frames, e.g., critical management frames associated with WiFi client connectivity, such as EAP frames and frames associated with authentication and/or association of IoT devices with the IoT network, are not affected when operation of WiFi radio 204 is suspended.

Figure 4:
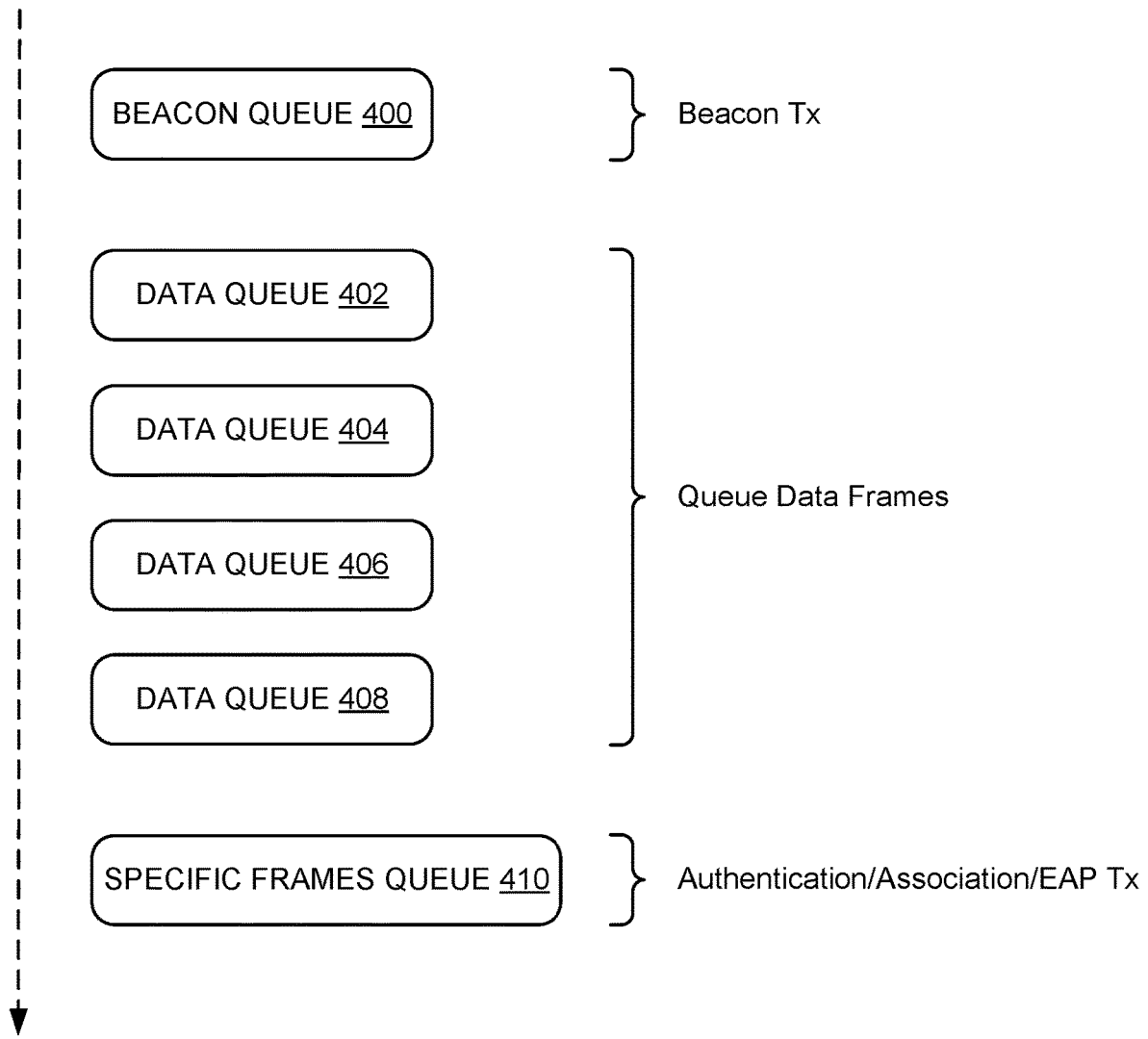
FIG. 4 illustrates an example representation of WiFi transmission status while operation of a WiFi radio is suspended in accordance with various embodiments of the present disclosure.

FIG. 4 illustrates an example queue state of WiFi radio 204 when suspended. As illustrated in FIG. 4, beacon frames may be queued in beacon queue 400, and may still be transmitted by WiFi radio 204. A management frames queue 410 may be established to allow the aforementioned management frames associated with, e.g., authentication, association, and EAP, to be transmitted as well despite WiFi radio 204 being suspended from transmitting actual data. In this way, a WiFi client's connection is not affected. Actual data frames associated with data to be transmitted by WiFi radio 204 may be held in one or more data queues 402-408 until WiFi radio 204 resumes operation. It should be noted that when a data queue is full and WiFi radio 204 is in a suspended state, subsequent data frames may be dropped. That said, in accordance with various embodiments, the amount of time WiFi radio 204 may be suspended can be limited, e.g., to no more than 8 ms. With proper limitations on the length of suspension, e.g., a maximum of 8 ms, it is contemplated that a data queue will not fill up.

In some embodiments, the duration for which WiFi radio 204 may be suspended to allow IoT data to be communicated from AP 200 can be less than ten milliseconds. In this way, and as noted above, WiFi throughput and connectivity associated with WiFi radio 204/AP 200 may be minimally impacted. For example, one IoT model may comprise one or more electronic shelf labels (ESLs) that display or otherwise reflect prices of objects for sale and/or images of tags or ESLs associated with the objects for sale. Accordingly, an ESL radio (operating in accordance with the TDMA channel access method) may be implemented on an AP in conjunction with a WiFi radio. Each of the one or more ESLs may connect to the ESL radio of the AP, allowing, e.g., a backend ESL server to update prices, images, etc. presented in or on an ESL. It should be understood that ESL radios generally operate in a particular range/frequency channel of the 2.4 GHz band, like WiFi radios. In conventional implementations, ESL radios can severely impact operation of a WiFi radio operating simultaneously or co-located with an ESL radio on an AP. Some statistics indicate that without the use of a coexistence coordination scheme, such as that described herein, ESL radio operation is impacted. For example, without use of a coexistence coordination scheme, operating performance of an ESL radio over different levels of WiFi traffic, e.g., from 50 Mbps to 10 Mbps, may be at below 5 percent to approximately 10 to 15 percent, where the lower the WiFi traffic/throughput, the better the ESL radio can perform. However, when an AP implements a coexistence coordinator such as that described herein, operating performance of the ESL radio can be between approximately 75 percent to 100 percent over the same range of WiFi traffic/throughput.

Figure 5:
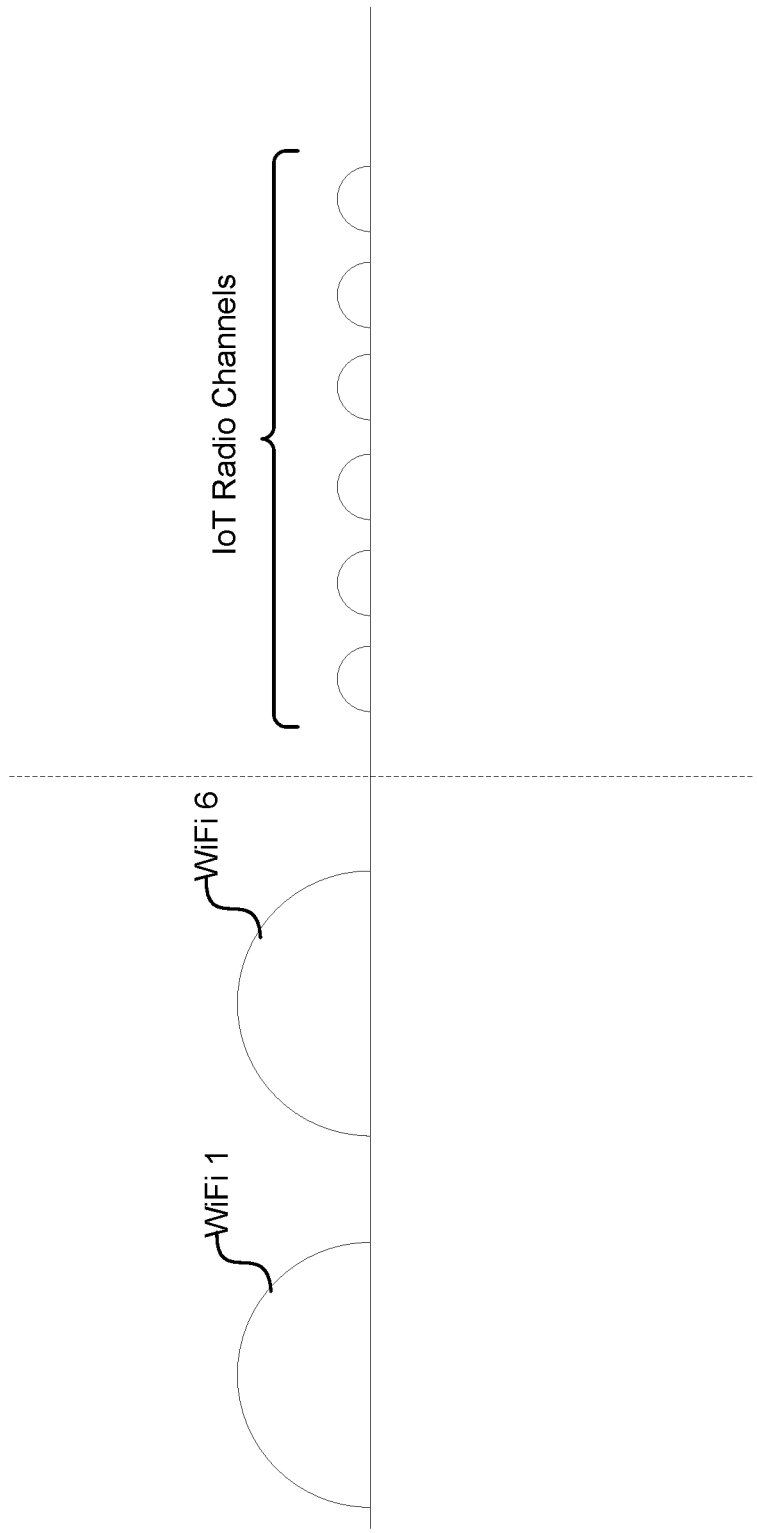
FIG. 5 illustrates an example of a channel division transmission method in accordance with various embodiments of the present disclosure.

As another way to avoid or at least reduce interference between coexisting WiFi and IoT radios, various embodiments of the present disclosure are directed to a channel division mechanism. In particular, and as illustrated in FIG. 5, a WiFi radio such as WiFi radio 204 may utilize an upper range of frequency channels in the 2.4 GHz band. For example, in the United States, a WiFi radio may be configured to communicate over WiFi Channel 1 (2.412 GHz with a bandwidth of 22 MHz) and WiFi Channel 6 (2.437 GHz with a bandwidth of 22 MHz). As also illustrated in FIG. 5, an IoT radio, such as IoT radio 206 may utilize a lower range of frequency channels in the 2.4 GHz band, e.g., 2.474 GHz, 2.476 GHz, 2.479 GHz, etc. with a bandwidth of 1 MHz. It should be noted that in accordance with another embodiment, an IoT radio of an AP may be configured to utilize an upper range of frequency channels while a WiFi radio of the AP may be configured to utilize a lower range of frequency channels.

Figure 6:
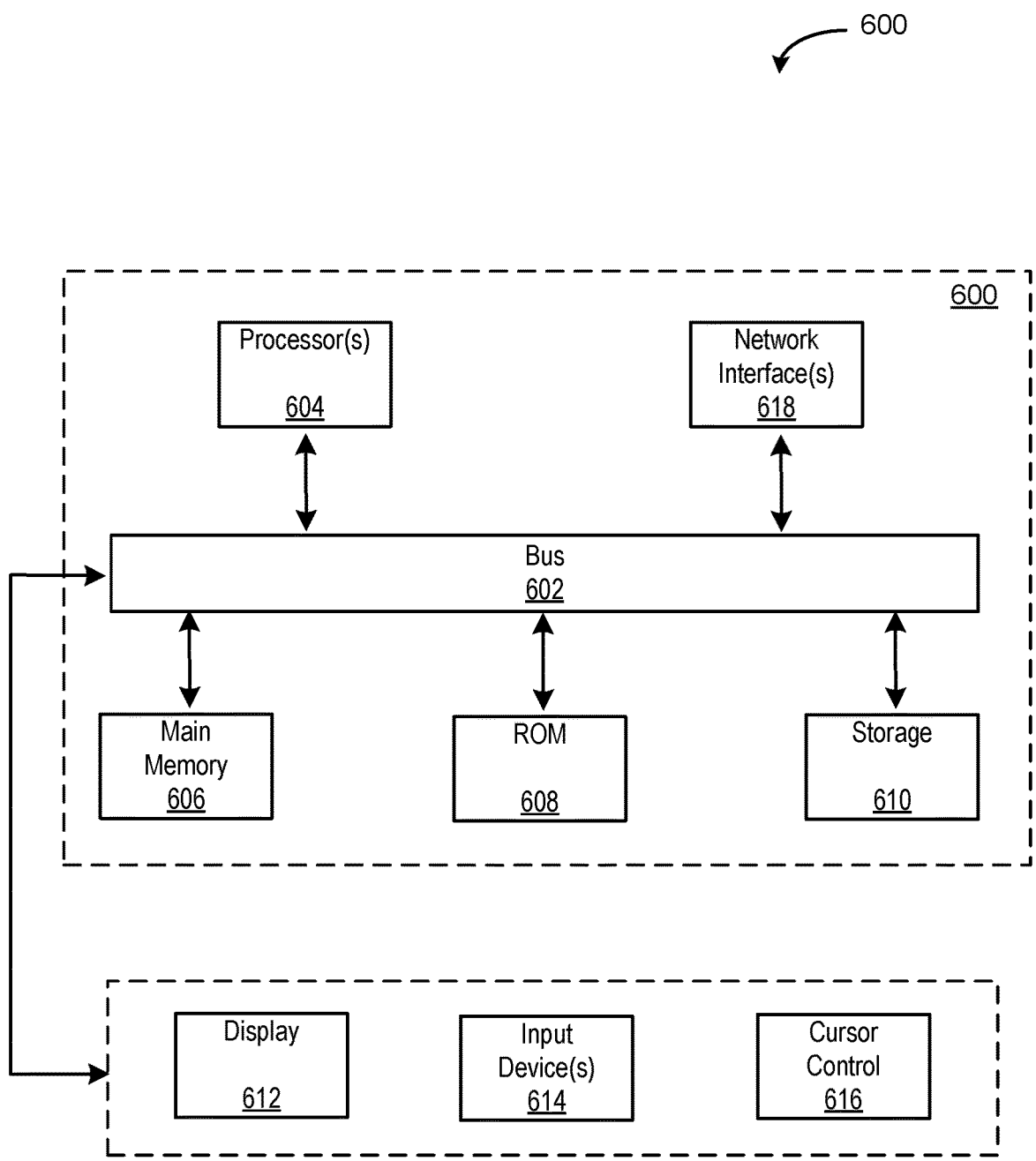
FIG. 6 is an example computing component that may be used to implement various features of embodiments described in the present disclosure.

FIG. 6 depicts a block diagram of an example computer system 600 in which various of the embodiments described herein may be implemented. Computer system 600 may be an embodiment of coexistence coordinator 202 or AP 200. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

What is claimed is:

1. A method comprising:
    synchronizing a coordinator clock time with a Time-Division Multiple Access (TDMA)-compliant radio and with a WiFi-compliant radio;
    calculating a start time and duration during which data associated with a transmission request from the TDMA-compliant radio is to be transmitted;
    suspend operation of the WiFi-compliant radio at the calculated start time for the calculated duration, allowing the data associated with the transmission request to be transmitted from the TDMA-compliant radio, wherein suspending operation of the WiFi-compliant radio comprises suspending transmission of WiFi data frames from the WiFi-compliant radio and continuing to transmit beacon frames from the WiFi-compliant radio while operation of the WiFi-compliant radio is suspended; and
    resume operation of the WiFi-compliant radio upon expiration of the calculated duration.

2. The method of claim 1, wherein the coordinator clock time comprises a monotonic clock time of a coexistence coordinator of an access point (AP).

3. The method of claim 1, wherein synchronizing the coordinator clock time comprises synchronizing the coordinator clock time based on firmware running in the WiFi-compliant radio or the TDMA-compliant radio.

4. The method of claim 2, wherein the WiFi-compliant radio and the TDMA-compliant radio coexist within the AP.

5. The method of claim 1, wherein the TDMA-compliant radio comprises an Internet of Things (IoT) radio adapted to transmit IoT-related data to a IoT device.

6. The method of claim 1, further comprising receiving periodic data transmission requests from the TDMA-compliant radio, the data transmission requests including a timestamp indicating a time at which the TDMA-compliant radio is to transmit data.

7. The method of claim 6, wherein the calculating of the start time comprises adding a time buffer prior to the time indicated by the timestamp, the time buffer compensating for performing one or more of the synchronizing of the coordinator clock time, the calculating of the start time and duration, and the suspending of the WiFi-compliant radio.

8. The method of claim 1, further comprising maintaining beacon frames to be transmitted within a beacon queue.

9. The method of claim 1, further comprising continuing to transmit management frames from the WiFi-compliant radio while operation of the WiFi-compliant radio is suspended.

10. The method of claim 9, further comprising maintaining management frames to be transmitted with a management frames queue.

11. The method of claim 1, further comprising queuing WiFi data to be transmitted in one or more data queues until operation of the WiFi-compliant radio resumes.

12. The method of claim 1, further comprising transmitting WiFi data from the WiFi-compliant radio using frequency channels within a first range of a WiFi band, and transmitting TDMA data from the TDMA-compliant radio using frequency channels within a second range of the WiFi band, the first range being higher and non-overlapping with the second range or the first range being lower and non-overlapping with the second range.

13. A WiFi radio coexisting with an Internet of Things (IoT) radio in an access point (AP), the WiFi radio comprising:
    a processor; and
    a non-transitory storage medium including instructions that when executed cause the processor to:
    synchronize a clock time of the WiFi radio with a coordinator component of the AP;
    suspend operation of the WiFi radio upon receipt of a signal from the coordinator component indicating a calculated start time and duration associated with a transmission request for transmitting data from the IoT radio, the IoT radio being adapted to transmit IoT-related data in accordance with a Time-Division Multiple Access (TDMA) channel access method, wherein suspending operating of the WiFi radio comprises instructions to suspend transmission of WiFi data frames from the WiFi radio, while allowing WiFi beacon frames and management frames to be transmitted from the WiFi radio; and resuming operation of the WiFi radio upon expiration of the calculated duration.

14. The WiFi radio of claim 13, wherein the calculated start time and duration include a time buffer added prior to a timestamp included in the transmission request, the timestamp indicating a time at which the IoT radio desires to transmit the IoT-related data.

15. An Internet of Things (IoT) radio coexisting with a WiFi radio in an access point (AP), comprising:
   at least one processor; and
   a non-transitory machine-readable storage medium including instructions that when executed cause the at least one processor to:
   synchronize a clock time of the IoT radio with a coordinator component of the AP;
   transmit to the coordinator component, one or more transmission requests for transmitting data from the IoT radio, the IoT radio being adapted to transmit IoT-related data in accordance with a Time-Division Multiple Access (TDMA) channel access method, the transmission request including a timestamp indicating a time at which the IoT radio is requesting to transmit the data; and
   transmitting the data from the IoT radio while operation of the WiFi radio is suspended in accordance with a calculated start time and duration based on the timestamp included in the transmission request, wherein suspending operation of the WiFi radio comprises suspending transmission of WiFi data frames from the WiFi radio and continuing to transmit beacon frames from the WiFi radio while operation of the WiFi radio is suspended.

16. The IoT radio of claim 15, wherein the calculated start time includes a time buffer added prior to the timestamp included in the transmission request.

17. The IoT radio of claim 15, wherein the instructions further cause the processor to perform transmission of the IoT-related data from the IoT radio utilizing frequency channels within a first range of a WiFi band, the first range either being higher and non-overlapping with a second range over which WiFi data is transmitted from the WiFi radio or lower and non-overlapping with the second range.

* * * * *